Dec. 8, 1942.                    E. B. SLEETER                    2,304,607
                        METHOD OF MAKING ELECTRIC MOTORS
                          Filed Oct. 12, 1938            3 Sheets-Sheet 1

INVENTOR
EDWARD B. SLEETER
BY
Spencer, Hardman & Fehr
his ATTORNEYS

Dec. 8, 1942.   E. B. SLEETER   2,304,607
METHOD OF MAKING ELECTRIC MOTORS
Filed Oct. 12, 1938   3 Sheets-Sheet 2

INVENTOR
*Edward B. Sleeter*
BY
*Spencer, Hardman & Fehr*
his ATTORNEYS

Patented Dec. 8, 1942

2,304,607

UNITED STATES PATENT OFFICE 2,304,607

METHOD OF MAKING ELECTRIC MOTORS

Edward B. Sleeter, Dayton, Ohio, assignor to General Motors Corporation, Detroit, Mich., a corporation of Delaware Application October 12, 1938, Serial No. 234,559

7 Claims. (Cl. 29—155.5)

This invention relates to the art of electric motors and the like and more particularly aims to provide a simplified and efficient construction together with certain novel methods of and means for producing such a construction.

An object of the present invention is the provision of an improved structure and process of construction which will effect a substantial economy in cost and labor.

Another object of the invention is to build up a laminated stator so as to maintain the uniform thickness of the stator tooth tips as they come from the properly made dies.

Another object of the invention is to build up a laminated stator by an extremely simple method in which eddy currents are reduced to a minimum thereby insuring maximum efficiency with a core of relatively small diameter.

Further objects and advantages of the present invention will be apparent from the following description, reference being had to the accompanying drawings wherein a preferred embodiment of the present invention is clearly shown.

Figures 1, 2:
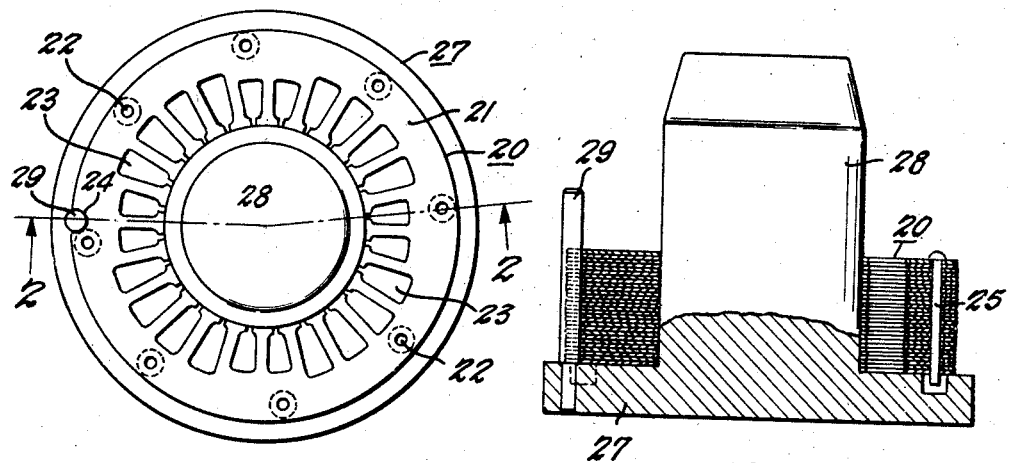
Fig. 1 is a plan view showing the preferred mode of assembling the laminations upon an arbor.
Fig. 2 is a vertical section taken on the line 2—2 of Fig. 1 and showing a rivet extending through the aligned apertures while assembled upon an arbor.

The present improvements relate to the method of building a stator and then securing the stator in a frame. The stationary member or stator is generally built up of laminations of metal of high magnetic permeability which are cut out by properly made dies with a punch press. These laminations are then stacked to form a pile or stack of laminations of the required length and in a definite relation to each other so that, in effect, the laminations are primarily aligned with respect to their internal margins and then secured together by securing means, such as rivets, to form the stationary member or stator. The internal margins may be out of alignment or off center due to the inaccuracy of the dies, and while this inaccuracy may be very slight, it may be sufficient to prevent an accurate centering of the armature. Therefore, it is necessary to true the stator bore. This is accomplished preferably by placing a steel retaining ring about the stator and then forcing a burnishing broach through the stator bore. The purpose of the ring is to maintain the external dimension of the stator while the broach is passing through stator bore. After the burnishing step, coil windings are assembled in the stator and the whole assemblage coated with an enameling fluid and then baked. Then a preformed frame is burnish-broached to size and forced over the stator.

The illustrated embodiment of the invention provides laminations of high magnetic permeability which are punched from sheet metal by properly made dies, each lamination comprising a thin circular lamination 20 having a ring portion 21 provided with spaced apertures 22 and having slots 23 in its inner periphery. The outer periphery of the laminations is provided with a notch 24.

Figures 3, 4:
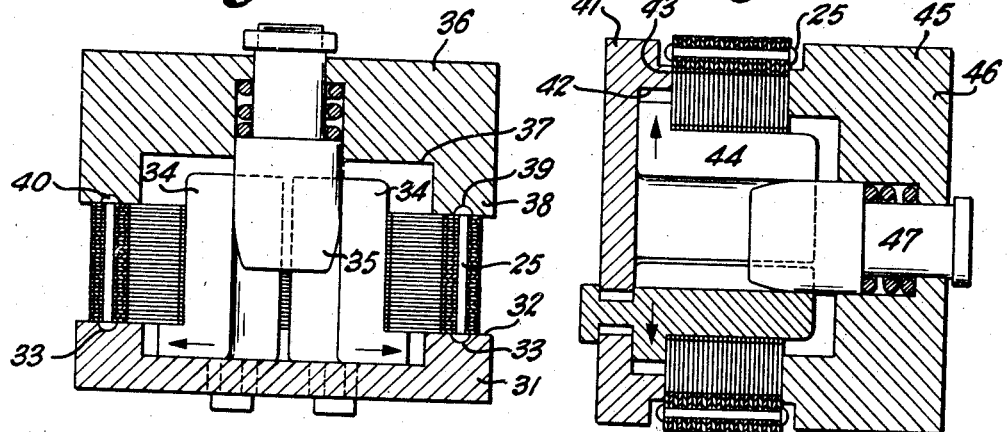
Fig. 3 is a sectional view showing the method of securing the laminations together to form the stator.
Fig. 4 is a sectional view of secured laminations supported on an expandable arbor and showing a method of trimming the periphery of the stator.
Figure 5:
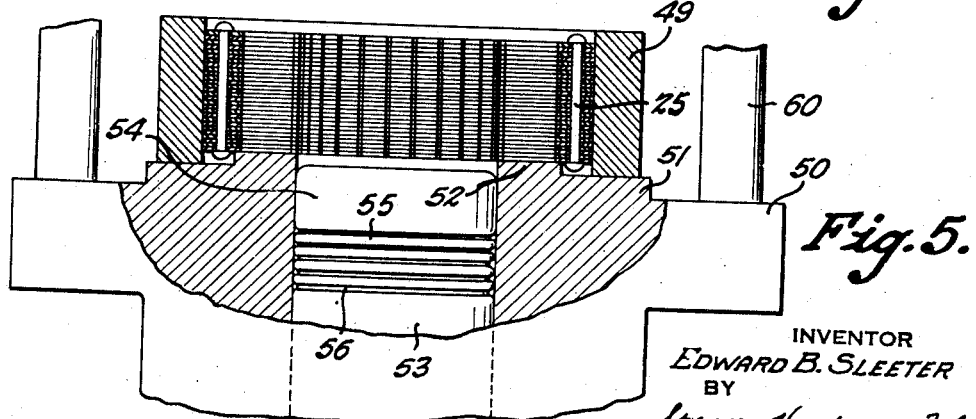
Fig. 5 is a fragmentary view of a burnisher and an embracing ring about the stator prior to the pilot entering the bore of the stator.
Figure 6:
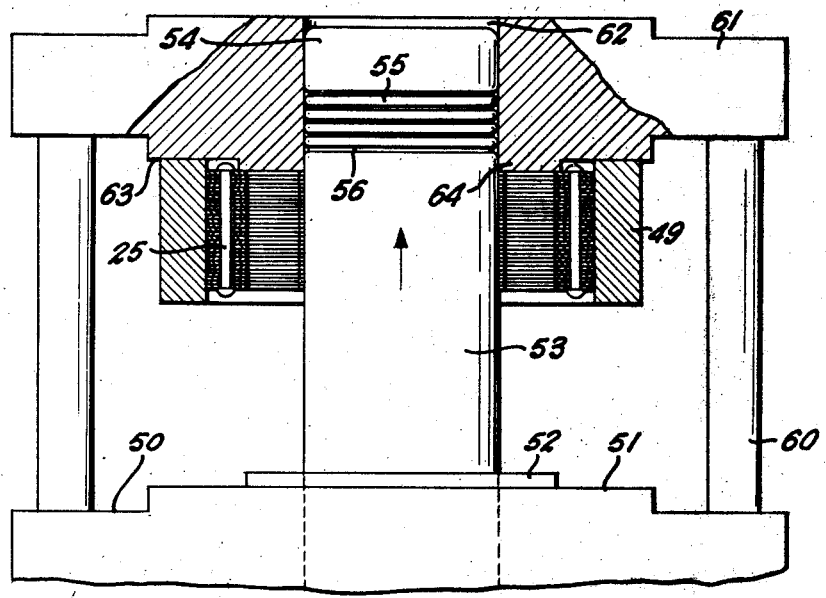
Fig. 6 shows the form of construction shown in Fig. 5 with the burnishing pilot forced through the bore of the stator.

The laminations are assembled face to face upon any suitable stacking fixture. In the present instance a stacking fixture 27 is provided with a cylindrical mandrel 28 and an upwardly projecting pin 29. As the laminations are placed over the mandrel 28, the pin 29 fits into the notches 24 which permits stacking of the laminations as shown in Fig. 1. This arrangement aligns the apertures 22 and the slots 23 of adjacent laminations. When the proper number of laminations are stacked in a pile rivets 25 are inserted through the aligned apertures. The stack of laminations is then removed from the fixture 27 and placed upon a riveting device comprising a base 31 which is recessed to provide an annular flange 32. The flange is provided with suitable notches 33 to receive the heads of the rivets 25 as shown in Fig. 3. Preferably the base supports a plurality of segmental members 34 which are slidably supported on the base 31. Associated with the segmental member is a pilot 35 yieldably supported from a head 36. The head is recessed as at 37 to provide an annular flange 38. The flange 38 is provided with recesses 39 that are in longitudinal alignment with the recesses 33 on the flange 32. When the head is subjected to power means, not shown, to rivet over the ends of rivets 25 as at 40, the pilot 35 operates in advance of the head to urge the segmental members 34 radially outward to align the laminations so that the inner margins of laminations will be as near concentric as possible before the ends of the rivets are deformed.

This means, in effect, that the stator tooth tip margins are substantially in alignment. However it is possible that the internal margins of several laminations may get out of alignment by whatever amount the rivets may vary in size.

The secured laminations or stator is then placed upon a holding fixture suitably supported upon a lathe or similar machine. The holding fixture comprises a base 41 which is recessed as at 42 to provide an annular flange 43 against which one end of the stator may rest. The base 41 slidably supports segmental members 44. Associated with the base 41 is a clamping fixture 45 having a head 46. The head 46 yieldably supports a pilot 47. When the head 46 is moved to the left as viewed in Fig. 4 the pilot will first engage the segmental members to urge them radially outwardly to maintain the concentric relation of the inner margins of the laminations. When the stator is clamped firmly between the base 41 and the head 46 the outer periphery is then machined to the desired dimension by a cutting tool 48 as illustrated in Fig. 4.

By the foregoing procedure, any lack of concentricity between the inside and outside diameters of the individual laminations (due to any inaccuracies in manufacturing) is transferred to the outside diameter of the riveted stack, and is then subsequently turned off.

Figure 7:
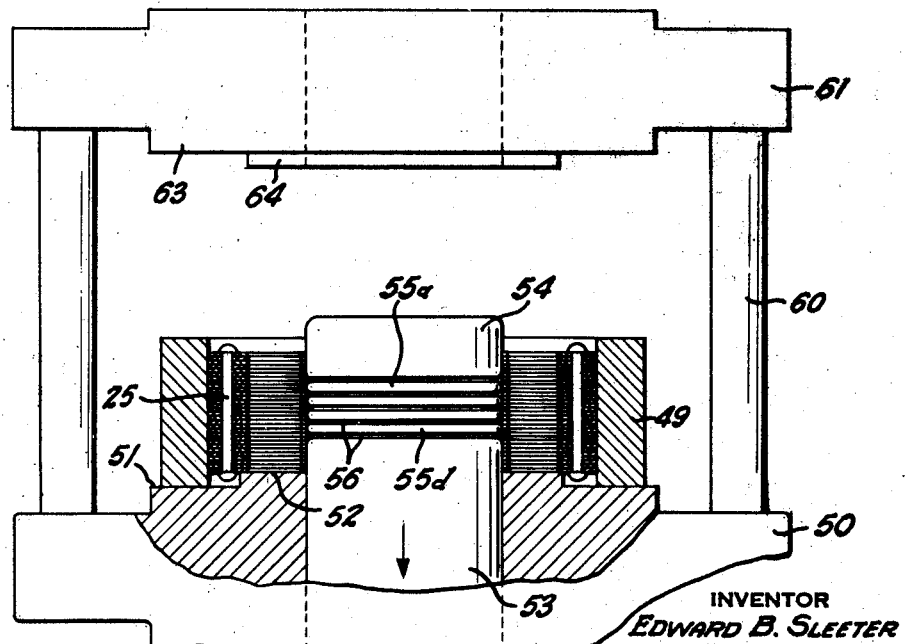
Fig. 7 is a view similar to Fig. 6 showing the position of the stator and ring as the pilot is leaving the stator.

A close fitting heavy metal ring 49 is placed around the machined stator and the stator together with the ring is placed on a jig comprising an apertured base 50. The base 50 is provided with a raised portion 51 upon which rest the ring 49 and a boss 52 which contacts one end of the stator but free of the heads of the rivets 25. The height of the boss is such that the head of the rivets will not engage the raised portion 51. Slidably supported within the base 50 is a broach 53. The broach 53 comprises a pilot portion 54, and a plurality of burnishing portions or rings 55 separated by relief grooves 56. The portion 54 is of such a diameter that it will enter the bore of the stator so as to line up the stator accurately. The annular ring portions 55 are of different diameters with the smaller ring portion 55a at the top and the largest ring portion 55d at the bottom as viewed in Fig. 7. The dimensions of the ring portions on the broach are so proportioned that the rings will gradually "iron out" any irregularities as the burnish-broach passes through the stator bore.

A plurality of posts 60 are supported on the base 50 the upper ends of which carry a head member 61 having an aperture 62, a flat portion 63 and boss 64. After the stator and ring are placed upon the base 60 the pilot is actuated by suitable power means, such as hydraulic pressure, and forced through the stator. The pilot portion 54 first enters the stator and continues upwardly through the stator until the first ring 55 engages some irregularity of one of the laminations. When this occurs the stator and ring 49 will move upwardly with the broach until the ring engages the surfaces 63 and the upper end of the stator engages the boss 64. When ring 49 engages the flat surface 63 and the stator engages the boss 64 the pilot continues in its movement through the stator causing the rings 55 to iron out all of the irregularities on any of the laminations within the stator bore to the desired size and roundness. The ring or shell 49 operates to maintain the external diameter of the stator intact.

After the stator has been broached the ring 49 is removed and the coil windings 26 are assembled in any well known manner. Then the stator with the coil windings assembled therein is passed through a coating or varnishing or enameling operation that is well known in the art.

After the baking operation the assemblage, comprising the stator and coil windings is placed upon a suitable press. The press includes a stationary member 71 provided with an annular recess 72 to form a flange 73 upon which rests one end of the stator. The recess 72 is adapted to receive the ends of the coil windings 26. The flange is provided with spaced notches 74 to receive the heads of rivets 25. A pilot or central rod 76 projecting from the base member 71 is adapted to extend through the bore of the stator. The pilot is reduced at 77 to form a shoulder 78. A burnishing broach 79 is fitted over the reduced portion 77 of the pilot and rests upon the shoulder 78. The broach 79 is provided with a pilot portion 80 and a burnishing surface 81.

It is to be understood that the arbor 76 can be of any construction. The arbor may be of the expansion type suitably supported with respect to the base 71. When an expansion arbor is used the arbor will expand before the frame 85 is forced upon the stator. By this arrangement the desired dimension and roundness of the stator bore is maintained as the frame is being forced on the stator.

Figure 8:
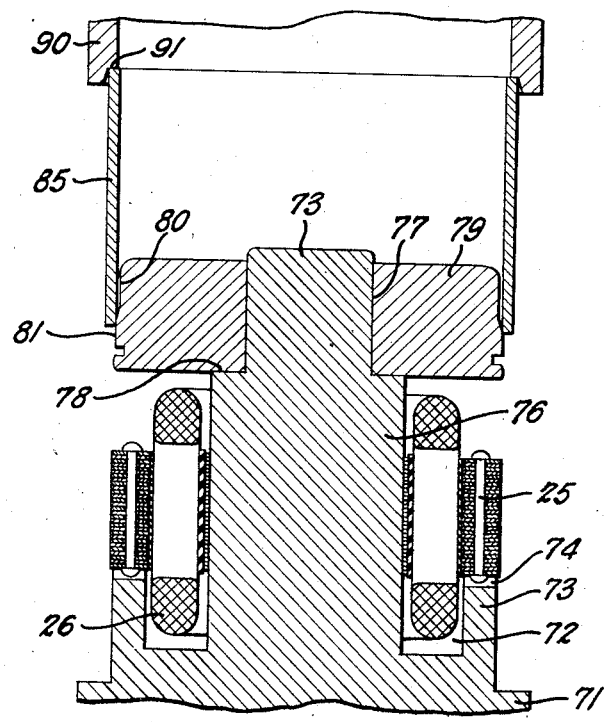
Fig. 8 is a fragmentary sectional view of a stator and coils therein supported upon an arbor, and a frame prior to its application to the stator.

A metallic tube or frame 85 previously formed is then placed upon the broach 79 with the lower end, encircling the pilot portion 80. The inside dimension of the tube 85 is slightly smaller than the dimension of the burnishing surface 81 as clearly shown in Fig. 8.

Figure 9:
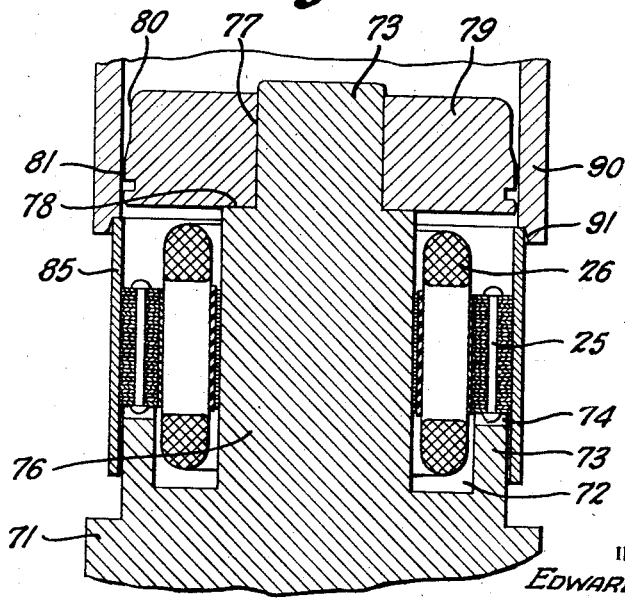
Fig. 9 shows the construction shown in Fig. 8 further advanced.

A movable head member 90 rabbeted as shown at 91 is adapted to receive the upper end of the frame 85. When power means is applied to move the head member 90 downwardly, as viewed in Fig. 8, the tubular member is forced over the burnishing surface 81 and then about the stator as shown in Fig. 9. This operation combines the sizing of the tube and the assembly of the tube on the stator in one operation and renders the entire assemblage rigid and relatively immovable.

While the embodiment of the present invention as herein disclosed, constitutes a preferred form, it is to be understood that other forms might be adopted, all coming within the scope of the claims which follow.

What is claimed is as follows:

1. The method of making a stator element for a dynamo electric machine comprising the steps of, assembling stator laminae in a stack, riveting the laminae together, cutting the periphery of the laminae to a desired dimension, burnishing the laminae bore to size, supporting the laminae upon an arbor, and then forcing a tubular member about the laminae.

2. The method of making dynamo electric machines with laminated stators comprising the steps of, forming the punchings each with spaced apertures in the outer annular ring portion of the punching, assembling the punchings with the apertures in substantial alignment, placing rivets through the apertures, deforming the rivets to hold the punching together to form a working unit, cutting the periphery of the laminated unit to the desired dimension, placing a ring about the unit, burnishing the inner bore of the unit, sizing a tubular housing, and then forcing the housing over the laminated unit.

3. The method of making a stator element for a dynamo electric machine comprising the steps of, assembling stator laminae in a stack, securing the laminae together by rivets passing through aligned apertures in the laminae, machining the periphery of the laminae to the desired dimension, fitting a solid ring about the periphery of the laminae, burnishing the laminae bore to size and roundness while the ring is about the laminae, removing the ring from the laminae, supporting the laminae upon an arbor to maintain the size and roundness of the bore, and then forcing a tubular member about the laminae.

4. The method of making a stator element for a dynamo electric machine comprising the steps of, assembling stator laminae in a stack, securing the laminae together to form a unit, machining the outer surfaces of the laminae, fitting a tubular member about the laminae, burnishing the laminae bore to size while the tubular member is about the laminae, removing the tubular member from the laminae, supporting the laminae upon an expansible arbor to maintain the size of the bore, sizing a tubular housing, and then forcing the housing over the laminae while the laminae are supported on the arbor.

5. The method of making a stator for dynamo electric-machine comprising the steps of assembling laminae having a bore formed of tooth tips in a stack, securing the stack of laminae together with similar tooth tips in alignment, forcing a tool through the bore of the stack to iron out any irregularities on the marginal edges of the tooth tips to finish the bore to a correct size so as to receive a rotating element of predetermined dimension, supporting the laminae upon a mandrel to maintain the correct size of the bore, and then forcing a tubular member axially about the periphery of the laminae while the laminae is supported on the mandrel.

6. The method of making a stator for a dynamo electric machine comprising the steps of, assembling the stator laminae in a stack, securing the stack of laminae together, passing a tool through the bore of the stack to iron out progressively the internal irregular marginal edges of the laminae beyond their limit of elasticity to finish the bore to correct size and roundness, supporting the laminae on a mandrel to maintain the correct size of the bore thus ironed out; and then progressively expanding a tubular housing and simultaneously forcing the expanded portion of the housing axially over the periphery of the stack of laminae while the stack of laminae is supported on the mandrel.

7. The method of making a stator for a dynamo electric machine comprising the steps of, assembling stator laminae in a stack, securing the laminae together, passing a tool through the bore of the stator to swage gradually any irregular internal marginal edges of the laminae beyond their limit of elasticity to finish the stator bore to size, supporting the laminae upon an expansible arbor to maintain the size of the bore, and then forcing a tubular housing axially over the laminae while the laminae is supported on the arbor.

EDWARD B. SLEETER.